United States Patent
Lin et al.

(10) Patent No.: US 8,410,958 B2
(45) Date of Patent: Apr. 2, 2013

(54) DIGITIZING APPARATUS, DIGITIZING METHOD AND CAPACITANCE TOUCH SENSING APPARATUS

(75) Inventors: Tsung-Fu Lin, Hsinchu Hsien (TW); Guo-Kiang Hung, Hsinchu Hsien (TW); Yi Cheng Hsieh, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 469 days.

(21) Appl. No.: 12/726,873

(22) Filed: Mar. 18, 2010

(65) Prior Publication Data
US 2010/0253550 A1  Oct. 7, 2010

(30) Foreign Application Priority Data
Apr. 2, 2009  (TW) ................................ 98110972 A

(51) Int. Cl.
*H03M 11/00* (2006.01)
(52) U.S. Cl. .......................................... 341/20; 345/173
(58) Field of Classification Search .................... 341/20; 345/173, 168, 174
See application file for complete search history.

(56) References Cited

U.S. PATENT DOCUMENTS

| | | | | |
|---|---|---|---|---|
| 5,156,025 A | * | 10/1992 | Frucco | 68/12.02 |
| 7,642,940 B1 | * | 1/2010 | McKenna et al. | 341/120 |
| 7,808,419 B2 | * | 10/2010 | Chen et al. | 341/166 |
| 8,059,708 B2 | * | 11/2011 | Lin et al. | 375/238 |

* cited by examiner

Primary Examiner — Brian Young
(74) Attorney, Agent, or Firm — Edell, Shapiro & Finnan, LLC

(57) ABSTRACT

A digital apparatus includes a timing control circuit, a period counter, a phase digitizer and a calculation circuit. The timing control circuit generates a first control signal according to a square wave signal and a predetermined value. The period counter generates a first digital value according to a reference clock signal and the first control signal. The phase digitizer generates a second digital value according to a phase difference between the square wave signal and the reference clock signal. The calculation circuit generates an output digital value according to the first digital value and the second digital value. An object of obtaining a high-resolution digitization with a reasonable sampling clock is realized by effectively combining the period counter with the phase digitizer.

19 Claims, 9 Drawing Sheets

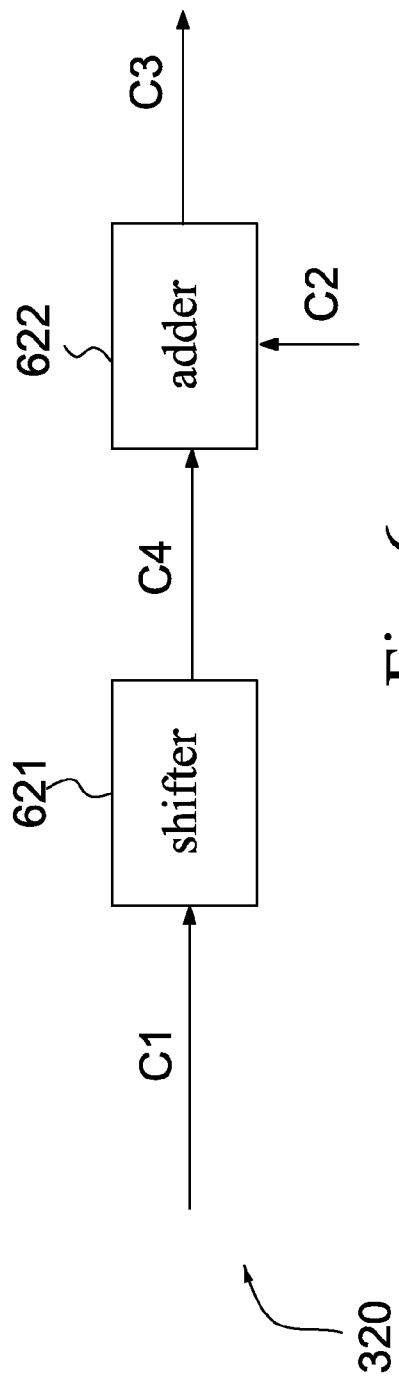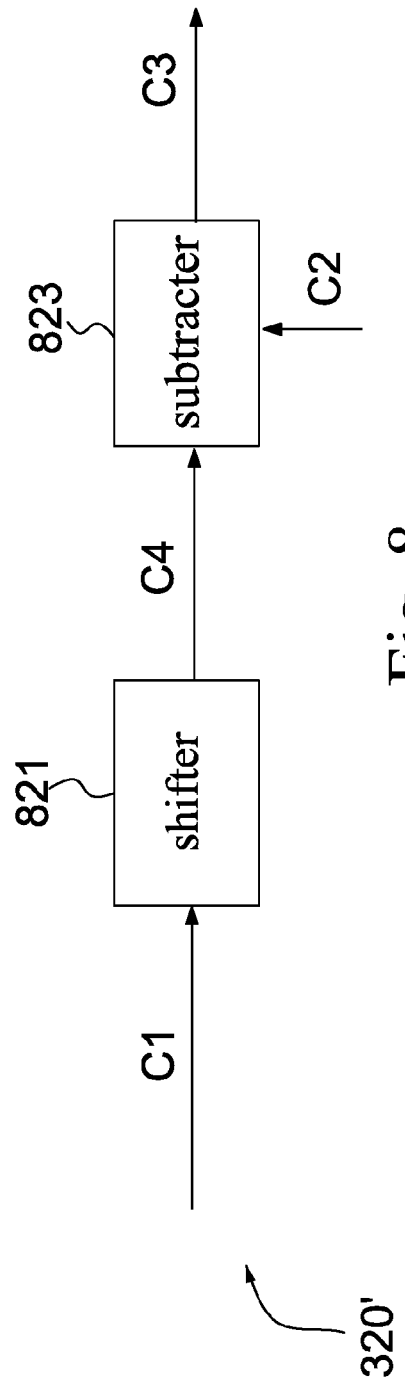

DIGITIZING APPARATUS, DIGITIZING METHOD AND CAPACITANCE TOUCH SENSING APPARATUS

CROSS REFERENCE TO RELATED PATENT APPLICATION

This patent application is based on Taiwan, R.O.C. patent application No. 98110972 filed on Apr. 2, 2009.

FIELD OF THE INVENTION

The present invention relates to a digitizing apparatus, and more particularly, to a low-cost and high-resolution digitizing apparatus.

BACKGROUND OF THE INVENTION

A conventional capacitance touch panel comprises a waveform generator and a capacitance digitizing apparatus. The waveform generator generates an oscillating square wave signal with a corresponding period according to equivalent capacitance of each row of capacitors. The capacitance digitizing apparatus generates a corresponding digital value according to the period of the foregoing oscillating square wave signal. Therefore, the digital value represents the equivalent capacitance.

FIG. 1 shows a schematic diagram a conventional waveform generator. A conventional waveform generator 120 comprises two current sources IDAC1 and IDAC2, an operational amplifier (Op-Amp) 121 and a comparator 122. The current sources IDAC1 and IDAC2 provide appropriate currents, and each row of capacitors (in directions of axis $X_1$ to $X_n$ and $Y_1$ to $Y_m$) on the capacitance touch panel is cross-coupled between a negative input end and an output end of the Op-Amp 121 to form an oscillating circuit, such that the Op-Amp 121 outputs a triangular wave signal, which is processed by the comparator 122 to generate an oscillating square wave signal OW. Thus, a period of the oscillating square wave signal OW represents sensed capacitance.

In related fields, two approaches are commonly used for digitizing a capacitance value. The first approach is to perform an analog-to-digital conversion by an analog-to-digital converter (ADC) to directly convert an analog capacitance value to a digital capacitance value. The second approach is a period counting approach, in which a period $T_{OW}$ of an oscillating square wave signal OW is calculated according to a period number PC of a reference clock SC with a known period $T_{SC}$. Taking FIG. 2A as an example, the period number PC, of the reference clock SC, for calculating n periods $T_{OW}$ of the oscillating square wave OW is r according to the reference clock SC. Therefore, the period $T_{OW}$ of the oscillating square wave signal OW is represented by $T_{OW}=T_{SC}\times r/n$, and a corresponding digital capacitance value is generated according to a predetermined relationship between an equivalent capacitance value and the period $T_{OW}$ of the oscillating square wave signal OW. For example, in a conventional waveform generator, capacitance is directly proportional to the period $T_{OW}$ of the oscillating square wave signal OW.

Generally speaking, the distance between adjacent capacitors on a capacitance touch panel is about 5 mm to 6 mm; however, higher coordinate resolutions are desired in various applications. At this point, a conventional arithmetic unit usually implements a following interpolation formula to calculate coordinate values.

$$\alpha_x = \frac{\sum_{i=1}^{n} i \times x_i}{\sum_{i=1}^{n} x_i}, \quad \alpha_y = \frac{\sum_{i=1}^{m} i \times y_i}{\sum_{i=1}^{m} y_i}$$

Referring to FIG. 2B, suppose that a user touches a position α to result in a change of capacitance of only two capacitors, a coordinate of the position α obtained according to the foregoing interpolation formula is represented as:

$$\alpha = \frac{x_1 + 2x_2}{x_1 + x_2}$$

When the coordinate resolution is required to be 1/64 of the distance between adjacent capacitors (e.g., the distance between adjacent capacitors is divided into 64 parts). it is calculated as:

$$\Rightarrow \frac{x_1 + 2x_2}{x_1 + x_2} = 1 + \frac{n}{64},$$
$$n \in N \text{ and } 1 \leq n \leq 63$$
$$\Rightarrow \frac{x_1}{x_2} = \frac{64-n}{n}$$
$$\Rightarrow \frac{x_1}{x_2} = \left\{ \frac{63}{1}, \frac{62}{2}, \frac{63}{3}, \cdots, \frac{1}{63} \right\}$$

Therefore, when the coordinate resolution is required to be 1/64 of the distance between adjacent capacitors, a bit width of $x_1$ and $x_2$ has to be more than 7 bits. Experimental statistics show that, the capacitance changes about 2% as a result of the user touching the capacitance touch panel. Taking a worst situation of 1% capacitance change for example, $2^7 \div 1\% = 12800 \approx 2^{14}$. Accordingly, as far as the period counting approach is concerned, it is necessary that the period value PC has a bit width of as high as at least 14 bits.

In practical applications, a coordinate resolution of a capacitance touch panel is determined according to a resolution of capacitance digitalization. For a system that demands a higher capacitance resolution, a high-resolution (a high bit-count) ADC is not only costly but also difficult to implement when applying the foregoing ADC for capacitance digitalization. However, supposing the foregoing period counting approach is adopted for capacitance digitalization, a sampling clock (a reference clock signal SC) with a higher frequency and a longer sampling period is also need, meaning that the system needs more power consumption and a longer response time. In order to solve the foregoing problem, the present invention is provided.

SUMMARY OF THE INVENTION

An object of an embodiment of the present invention is to provide a digitizing apparatus combining a period counter with a phase digitizer to increase a resolution of an output value.

According to an embodiment of the present invention, a digitizing apparatus comprises a timing control unit, for generating a first control signal according to a square wave signal and a predetermined value; a period counter, for generating a first digital value according to a reference clock signal and the first control signal; a phase digitizer, for generating a second digital value according to a phase difference between the square wave signal and the reference clock signal; and a calculation unit, for generating an output digital value according to the first digital value and the second digital value.

According to another embodiment of the present invention, a capacitance touch sensing apparatus comprises a capacitance touch panel; a multiplexer, coupled to the capacitance touch panel; a waveform generator, coupled to the multiplexer, for generating a square wave signal; and a digitizing apparatus. The digitizing apparatus comprises a timing control unit, coupled to the waveform generator, for generating a first control signal according to the square wave signal and a predetermined value; a period counter, for generating a first digital value according to the first control signal and a reference clock signal; a phase digitizer, for generating a second digital value according to a phase difference between the square wave signal and the reference clock signal; and a calculation unit, for generating an output digital value according to the first digital value and the second digital value.

According to yet another embodiment of the present invention, a digitizing method comprises generating a first control signal according to a square wave signal and a predetermined value; counting according to a reference clock signal and the first control signal to generate a first digital value; digitizing a phase difference between an input signal and the reference clock signal to generate a second digital value; and calculating the first digital value and the second digital value to generate an output digital value.

According to the foregoing digitizing apparatus and the capacitance touch sensing apparatus, a high coordinate resolution is obtained by generating a high-resolution digital signal.

The following description and figures are provided to gain a better understanding of the advantages of the present invention.

BRIEF DESCRIPTION OF THE DRAWINGS

FIG. 6 is a functional block diagram of a calculation circuit of a digitizing apparatus in accordance with an embodiment of the present invention.

FIG. 8 is a functional block diagram of a calculation circuit of a digitizing apparatus in accordance with another embodiment of the present invention.

DETAILED DESCRIPTION OF THE PREFERRED EMBODIMENT

Figure 1:
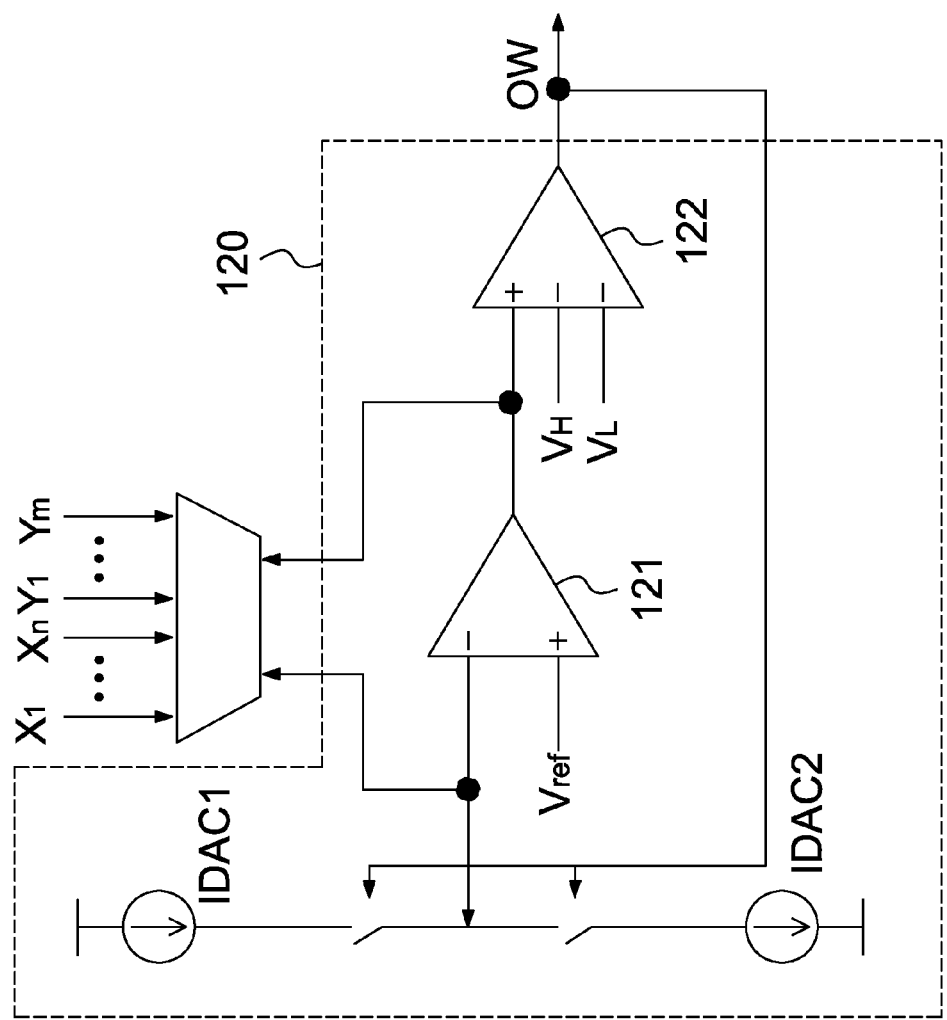
FIG. 1 is a schematic diagram of a conventional waveform generator.
Figure 2A:
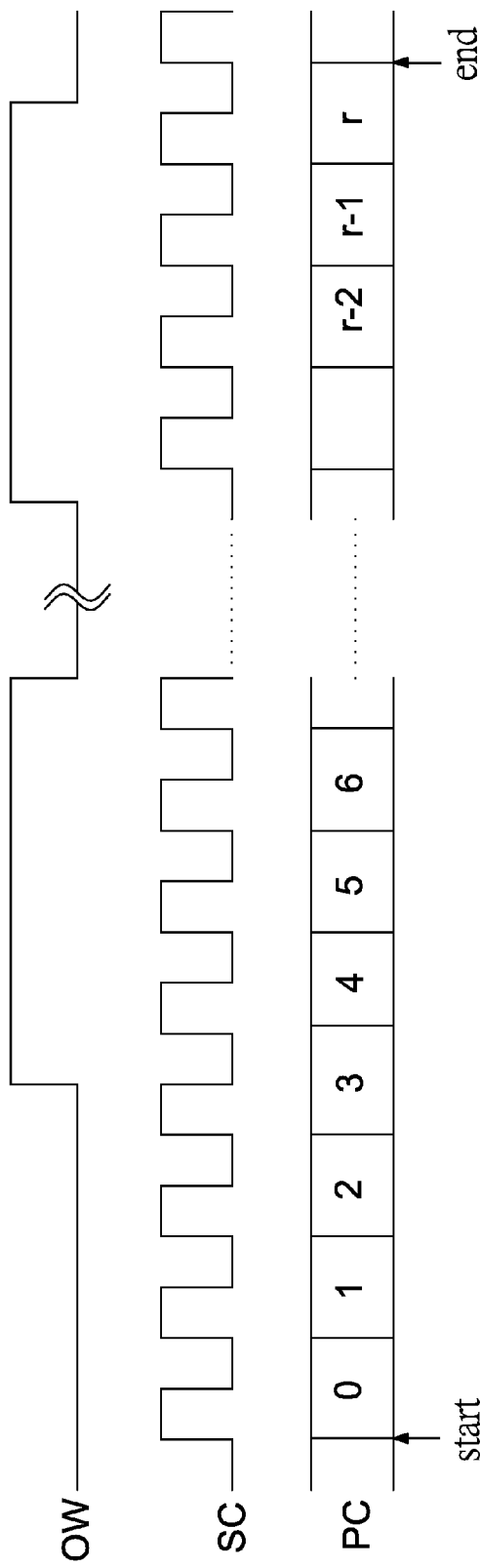
FIG. 2A is a relationship diagram among an oscillating square wave signal, a reference clock signal and a period count value in the prior art.
Figure 2B:
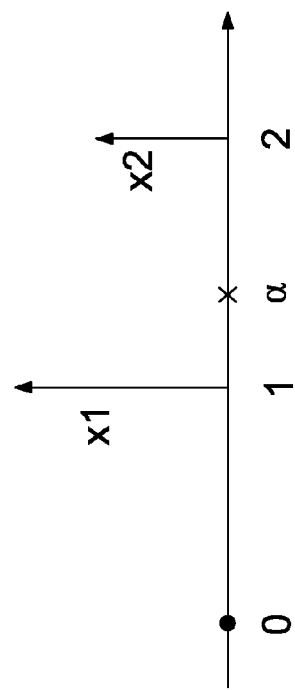
FIG. 2B is a position relationship diagram of capacitors 0, 1 and 2, and a coordinate value α.
Figure 3:
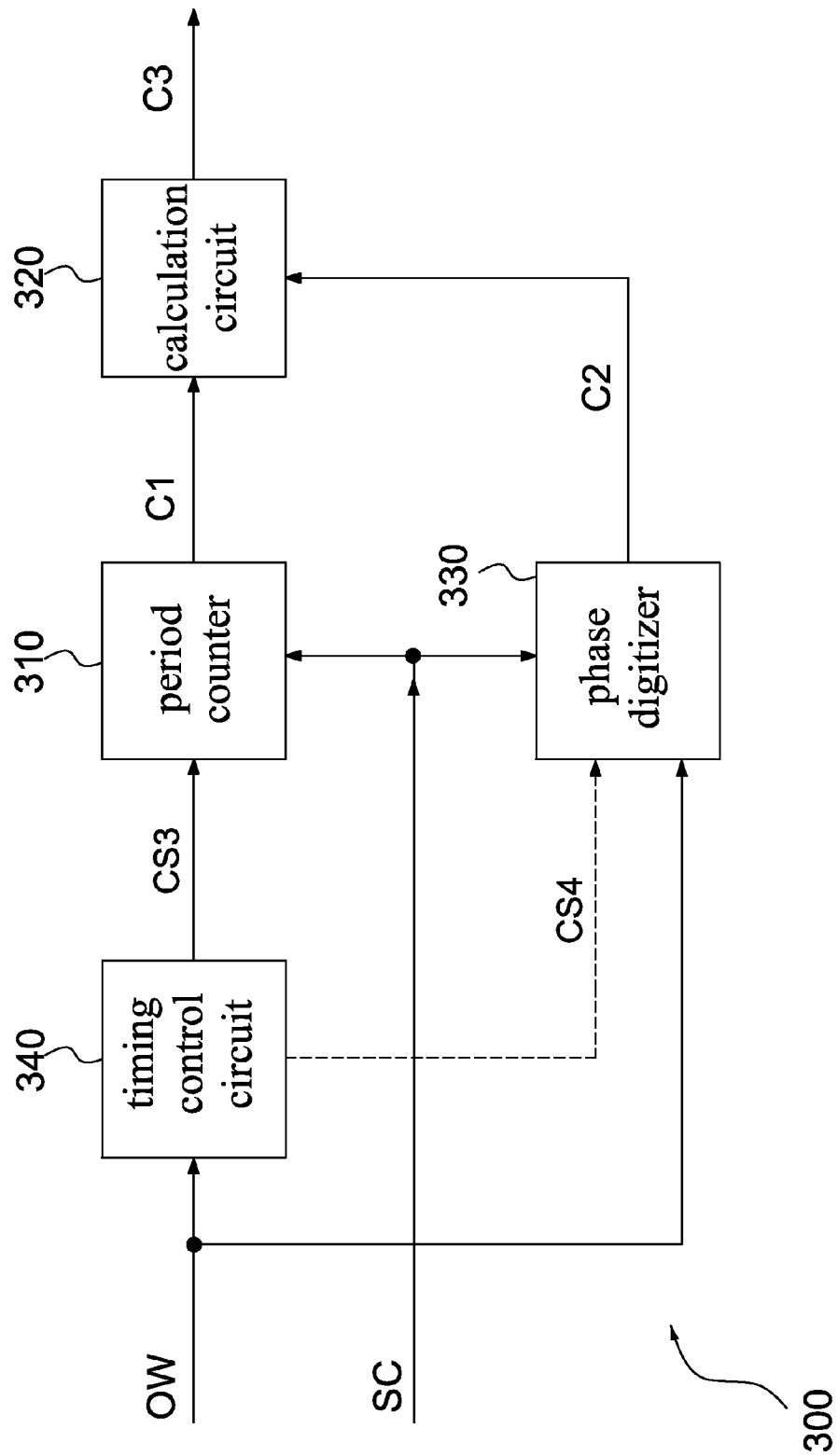
FIG. 3 is a functional block diagram of a digitizing apparatus in accordance with an embodiment of the present invention.

FIG. 3 shows a functional block diagram of a digitizing apparatus in accordance with an embodiment of the present invention. A digitizing apparatus 300 comprises a period counter 310, a calculation circuit 320, a phase digitizer 330, and a timing control circuit 340. The timing control circuit 340 generates a control signal CS3 according to an input oscillating square wave signal OW and a predetermined value s, so as to activate and deactivate the period counter 310. The oscillating square wave signal OW is an input signal of the digitizing apparatus 300. The period counter 310 generates a digital value c1 according to the control signal CS3 and a reference clock signal SC. The phase digitizer 330 digitizes a phase difference PE between the oscillating square wave signal OW and the reference clock signal SC to generate a digital value c2. The calculation circuit 320 generates an output value c3 according the digital values c1 and c2.

Figure 4:
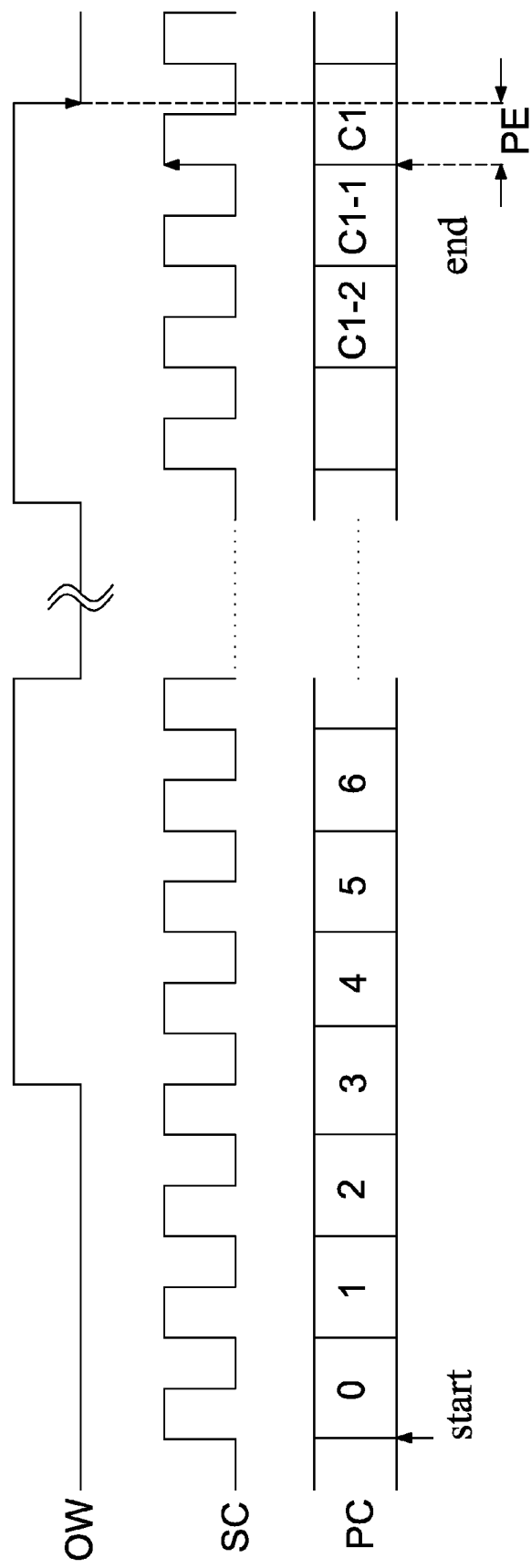
FIG. 4 is a relationship diagram among an oscillating square wave signal, a reference clock signal and a period count value of a digitizing apparatus in accordance with an embodiment of the present invention.

FIG. 4 is a relationship diagram among an oscillating square wave signal, a reference clock signal and a period count value of a digitizing apparatus in accordance with an embodiment of the present invention. Referring to FIG. 3 and FIG. 4, upon starting to calculate a period number of the oscillating square wave signal OW, the timing control circuit 340 transmits a control signal CS3 comprising a first logical level so that the period counter 310 starts counting according to the reference clock signal SC. When the period number of the oscillating square wave signal OW calculated by the timing control circuit 340 reaches a predetermined value s, the timing control circuit 340 transmits the control signal CS3 comprising a second logic level (e.g., a logical high level), so that the period counter 310 stops counting and generates the digital value c1 representing the period number of the reference clock signal SC needed by s periods of the oscillating square wave signal OW. In this embodiment, the timing control circuit 340 calculates the period number of the oscillating square wave signal OW by detecting falling edges of the oscillating square wave signal OW and adding up the number of detected falling edges of the oscillating square wave signal OW. When an $s^{th}$ falling edge of the oscillating square wave signal OW is detected, the timing control circuit 340 transmits the controls signal CS3 so that the period counter 310 stops counting. The period counter 310 counts by regarding a rising edge of the reference clock signal SC as a reference point. In a counting process, when the control signal CS is received, the period counter 310 immediately stops counting. Therefore, a count value of the period counter 310 is the number of rising edges of the reference clock signal SC before the $s^{th}$ falling edge of the oscillating square wave signal OW.

Figure 5C:
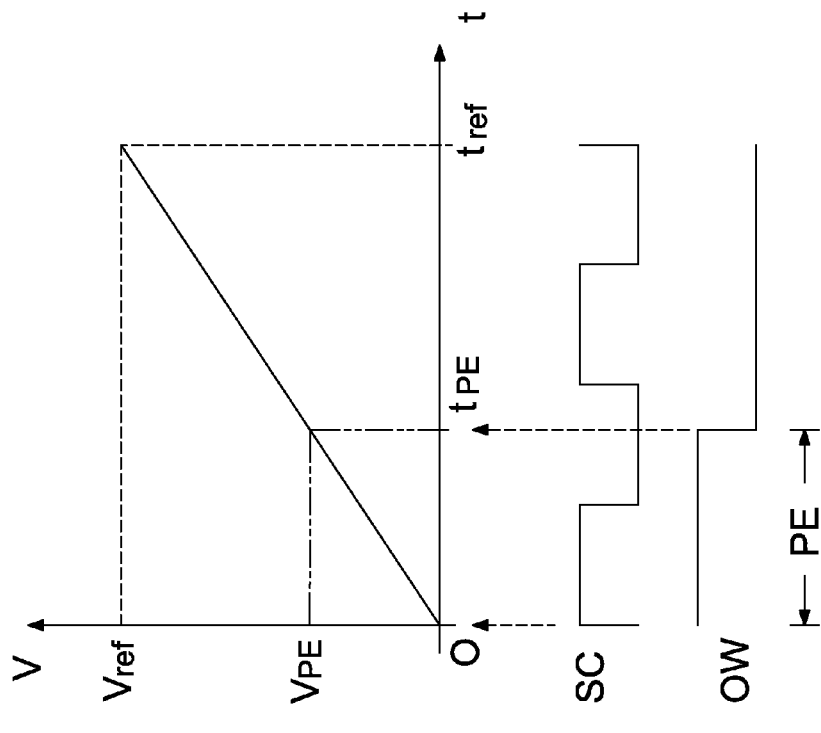
FIG. 5C is a relationship diagram of a phase difference between several periods of a reference clock signal and an oscillating square wave signal in accordance with an embodiment of the present invention.
Figure 5A:
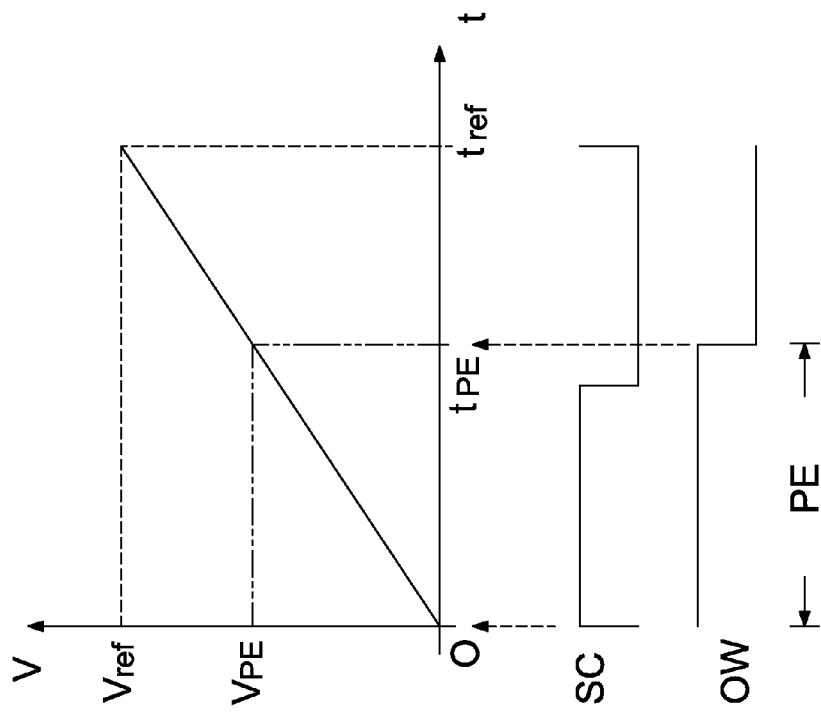
FIG. 5A is a relationship diagram of a phase difference between a reference clock signal during a single period and an oscillating square wave signal in accordance with an embodiment of the present invention.

FIG. 5A shows a relationship diagram of a phase difference between a reference clock signal during a single period and an oscillating square wave signal in accordance with an embodiment of the present invention. A method for digitizing a phase difference PE by the phase digitizer 330 of the present invention to a digital value c2 is described below.

In an embodiment, referring to FIG. 5A, during a complete period $t_{ref}$ of a reference clock signal SC, a constant current is applied to charge a capacitor, and a voltage of the capacitor rises from 0 to $V_{ref}$. When a rising edge of the reference clock signal SC is detected, the phase digitizer 330 enters a phase detecting stage to start charging the foregoing capacitor, and the phase detecting stage ends when a falling edge of the oscillating square wave signal OW is detected. During the phase difference PE period (or the phase detecting stage), a charging voltage of the capacitor rises from 0 to $V_{PE}$. A phase difference PE time $t_{PE}$ is calculated by the phase digitizer 330 according to Formula 1:

$$t_{PE} = \frac{V_{PE}}{V_{ref}} \times t_{ref} \quad (1)$$

Figure 5B:
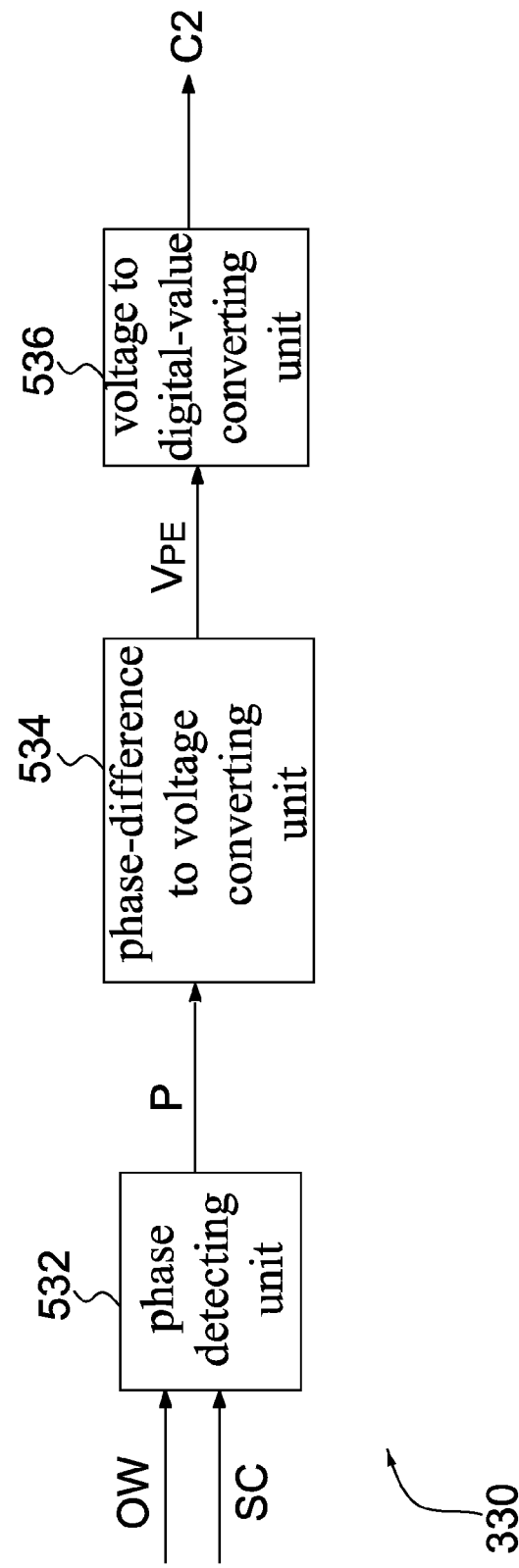
FIG. 5B is a schematic diagram of a phase digitization of a digitizing apparatus in accordance with an embodiment of the present invention.

FIG. 5B shows a schematic diagram of a phase digitizer 330 of a digitizing apparatus in accordance with an embodiment of the present invention. The phase digitizer 330 comprises a phase detecting unit 532, a phase-difference to voltage converting unit 534, and a voltage to digital-value converting unit 536. Referring to FIGS. 5A and 5B, the phase detecting unit 532 detects a phase difference between the reference clock signal SC and the oscillating square wave signal OW. In this embodiment, the phase detecting unit 532 detects rising edges of the reference clock signal SC and falling edges of the oscillating square wave signal OW to generate the phase difference. When a rising edge of the reference clock signal SC is detected, the phase detecting unit 532 outputs a phase signal to the phase-difference to voltage converting unit 534, which starts to charge a capacitor. After that, when a falling edge of the oscillating square wave signal OW is detected, the phase detecting unit 532 again outputs a phase signal P to the phase-difference to voltage converting unit 534. Upon receiving the phase signal P, the phase-difference to voltage converting unit 534 stops charging the capacitor and outputs a voltage $V_{PE}$ of the capacitor. The voltage to digital-value converting unit 536 generates a digital value c2 according to a reference voltage $V_{ref}$, a reference period $t_{ref}$, and the voltage $V_{PE}$.

FIG. 5C shows a relationship diagram of a phase difference between multiple periods of a reference clock signal SC and an oscillating square wave signal OW in accordance with an embodiment of the present invention. In another embodiment of a phase digitizer 330, the reference period $t_{ref}$ in Formula 1 comprises two complete periods of the reference clock signal SC, and the reference voltage $V_{ref}$ in Formula 1 is a charged voltage of a capacitor during the reference period $t_{ref}$. Provided that a voltage $V_{PE}$ is detected by the phase digitizer 330, the phase difference PE time $t_{PE}$ is also calculated according to Formula 1. For example, the phase digitizer 330 is realized by an analog-to-digital converter (ADC).

When a digitizing apparatus is requested to support a high resolution of P bits, a circuit designer can determine Q (where P>Q) bits of a resolution of the phase digitizer 330, and the remaining P-Q bits are then the resolution of the period counter 310. In this embodiment, as observed from FIG. 4A and FIG. 5A, in the digitizing apparatus 300 of the present invention, the function of the period counter 310 is equivalent to determining a decimal fraction of a quotient generated by dividing a period of the oscillating square wave signal OW by a reference period of a reference clock signal SC, i.e., $t_{PE}/t_{ref}$. Since a floating-point calculation of a decimal fraction is rather complicated, the decimal fraction is simplified to an integer for calculation in practical applications. FIG. 6 shows a functional block diagram of the calculation circuit 320 of the digitizing apparatus 300 in accordance with an embodiment of the present invention. The calculation circuit 320 comprises a shifter 621 and an adder 622. The shifter 621 shifts a digital value c1 of P-Q bits leftward by Q bits to generate an output digital value c4 of P bits. The adder 622 adds the P-bit output value c4 to a Q-bit digital value c2 generated by the phase digitizer 330, so as to obtain a P-bit output digital value c3. Taking P equal to 16 and Q equal to 8 as an example, referring to FIG. 4, suppose that the digital value c1 outputted by the period counter 310 is equal to 0x75, and the $t_{PE}/t_{ref}$ rate generated by the phase digitizer 330 is equal to 0.8. Accordingly, the output digital value c2 of the phase digitizer 330 is equal to 0xCC (i.e., 0.8x(0xFF)), and the shifter 621 shifts the 8-bit digital value c1 (0x75) leftward by 8 bits to generate the 16-bit output digital value c4 (0x7500). The adder 622 adds the 16-bits output digital value c4 (0x7500) to the 8-bit digital value c2 (0xCC) generated by the phase digitizer 330, so as to obtain the 16-bit output value c3 (0x75CC).

Figure 7:
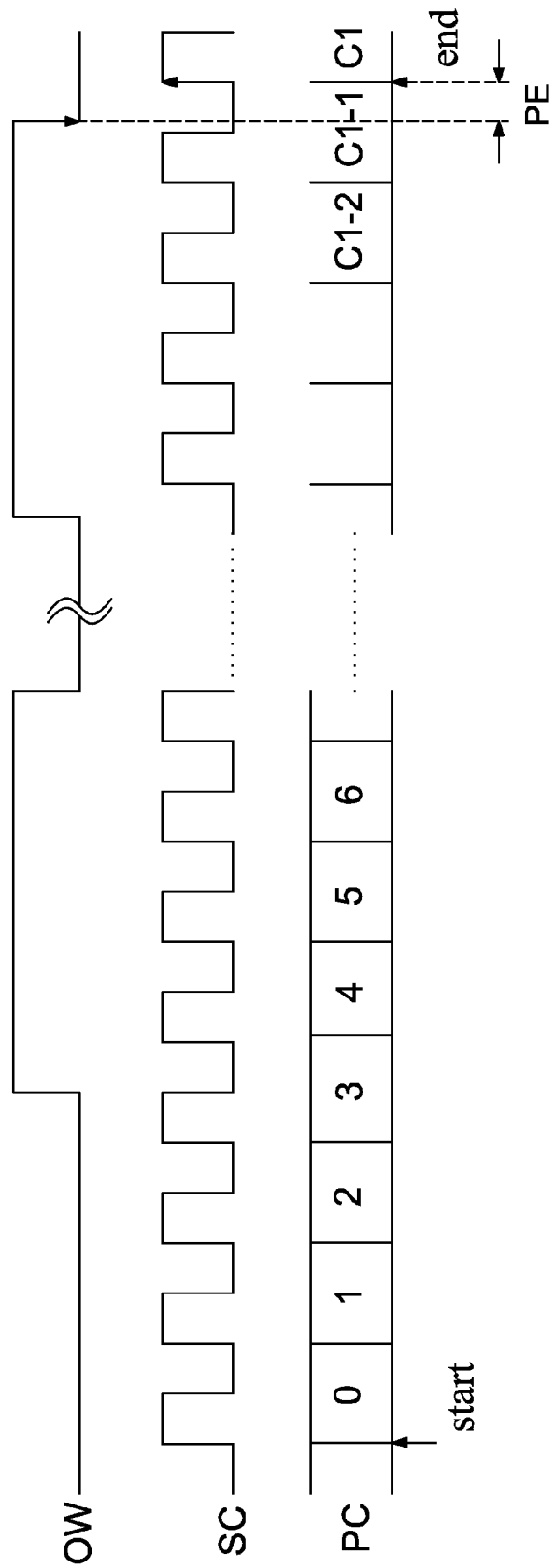
FIG. 7 is a relationship diagram among an oscillating square wave signal, a reference clock signal and a period count value of a digitizing apparatus in accordance with an embodiment of the present invention.

FIG. 7 shows a relationship diagram of an oscillating square wave signal, a reference clock signal and a period count value of a digitizing apparatus in accordance with an embodiment of the present invention. In this embodiment, upon detecting an $s^{th}$ falling edge of an oscillating square wave signal OW, the timing control circuit 340 transmits a control signal CS3 so that a period counter 310 stops counting. The period counter 310 counts by regarding a rising edge of a reference clock signal SC as a reference point, and stops counting upon detecting a rising edge of the reference clock signal after the control signal CS3 is received in the counting process. Therefore, a count value of the period counter 310 is a number counted at a first rising edge of the reference clock signal SC right after the $s^{th}$ falling edge of the oscillating square wave signal OW.

When a falling edge of the oscillating square wave signal OW is detected, the phase digitizer 330 enters a phase detecting stage to charge a capacitor via a constant current until a rising edge of the reference clock signal SC is detected. During the phase difference time PE (or in the phase detecting stage), a charging voltage of the capacitor rises from 0 to $V_{PE}$. FIG. 8 shows a block diagram of a calculation circuit of a digitizing apparatus in accordance with an embodiment of the present invention. A calculation circuit 320' comprises a shifter 821 and a subtracter 823. The shifter 821 shifts a digital value of P-Q bits leftward by Q bits to generate a P-bit output value c4. The subtracter 823 subtracts the Q-bit digital value c2 generated by the phase digitizer 330 from the P-bit output value c4 to obtain a P-bit output value c3. Taking P equal to 16 and Q equal to 8 as an example, referring to FIG. 7, suppose that the digital value c1 of the period counter 310 is equal to 0x76, and a $t_{PE}/t_{ref}$ rate detected by the phase digitizer 330 is equal to 0.2. Accordingly, the output digital value c2 of the phase digitizer 330 is equal to 0x34, the shifter 821 shifts the 8-but digital vale c1 (0x76) leftward by 8 bits to generate a 16-bit output value c4 (0x7600). The subtracter 823 subtracts the 8-bit digital value c2(0x34) generated by the phase digitizer 330 from the 16-bit output value c4(0x7600) to obtain a 16-bit output value c3(0x75CC).

In an embodiment, the phase digitizer 330 only performs phase digitization at a clock before/after that the period counter 310 stops counting, and the phase digitizer 330 is turned off at other times to reduce power consumption. As illustrated by a dash line in FIG. 3, the timing control circuit 340 generates another control signal CS4 according to a predetermined value s of the oscillating square wave signal OW to turn on or turn off the phase digitizer 330. For example, supposing that the predetermined value s is equal to 100 and a time for stabilizing the phase digitizer 330 from being turned on is shorter than a period of the oscillating square wave signal OW, the timing control circuit 340 transmits the control signal CS4 when the predetermined value is equal to 99 to turn on the phase digitizer 330, and transmits the control signal CS3 when the predetermined value s is equal to 100 to control the period counter 310 to stop counting. When the predetermined value s is greater than 100, the timing control circuit 340 transmits the control signal CS4 to turn off the phase digitizer 330, so as to reduce the power consumption.

A digitizing apparatus provided by the present invention combines a period counter with a phase digitizer to increase a resolution of a digitizing apparatus, implements the period counter to coarse estimate a frequency of an oscillating square wave signal OW, and implements the phase digitizer to accurately calculate the phase difference between the oscillating square wave signal OW and a reference clock signal SC, so as to obtain a digital capacitance value with a high resolution without using a costly high-bit ADC or a high-frequency sampling clock.

Figure 9:
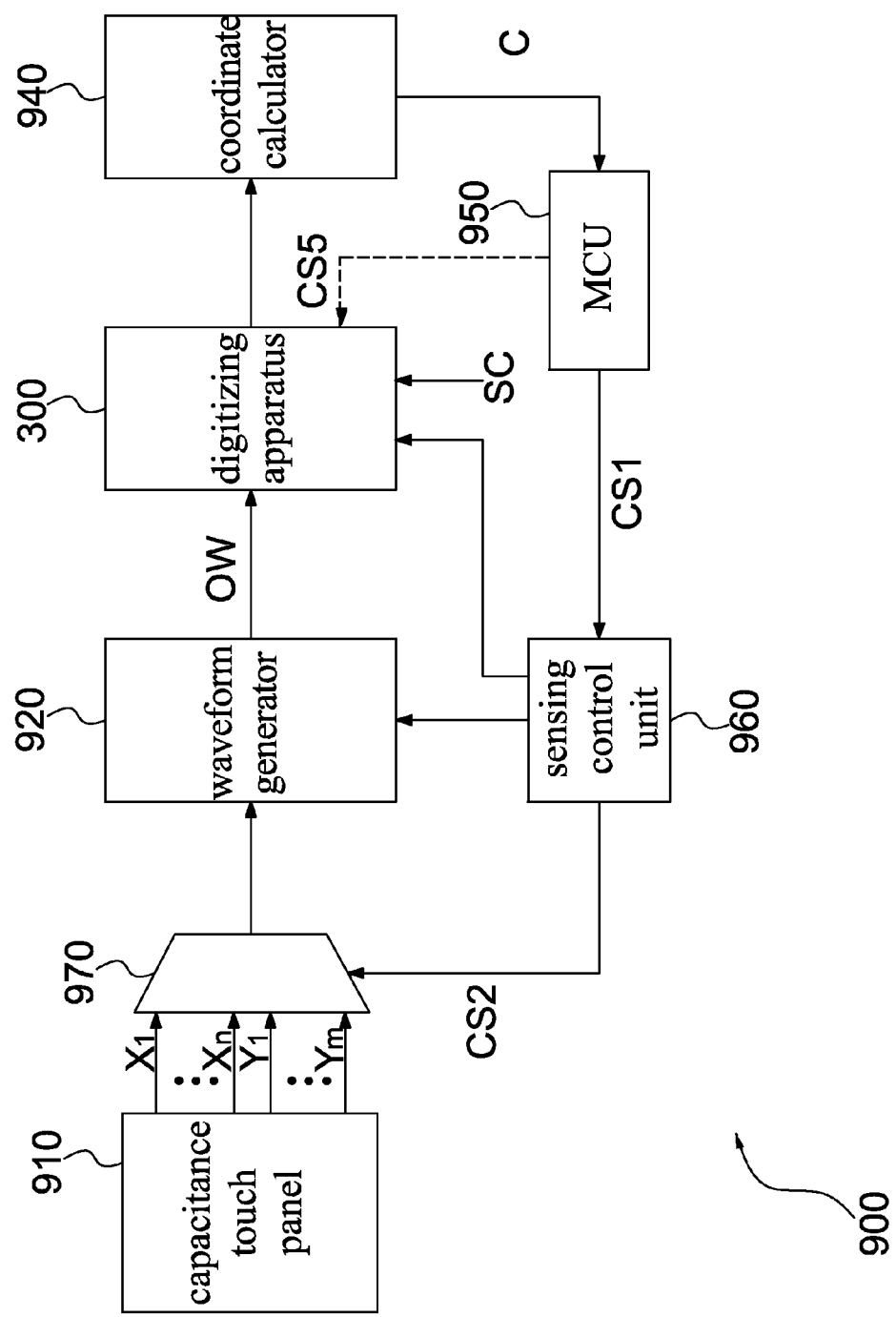
FIG. 9 is a block diagram of a capacitance touch panel apparatus in accordance with an embodiment of the present invention.

FIG. 9 shows a block diagram of a capacitance touch panel apparatus in accordance with the present invention. A capacitance touch panel apparatus 900, realized by a digitizing apparatus 300 of the present invention, digitizes a capacitance value with the digitizing apparatus 300 to achieve an object of obtaining a high coordinate resolution. The capacitance touch panel apparatus 900 comprises a capacitance touch panel 910, a multiplexer 970, a waveform generator 920, the digitizing apparatus 300, a coordinate calculator 940, a microcontroller 950, and a sensing control unit 960.

The capacitance touch panel 910 is composed of m x n capacitors, where m is a number of capacitors in an X-axis direction, and n is a number of capacitors in a Y-axis direction. The sensing control unit 960 generates a control signal CS2 according to a control signal CS1 outputted by the microcontroller 950, and controls a multiplexer 970 via a time-division approach such that the multiplexer 970 in sequence outputs an equivalent capacitance value of each row of capacitors (in directions of axis $X_1$ to $X_n$ and $Y_1$ to $Y_m$). The control signal CS2 serves as a select signal of the multiplexer 970. At this point, the sensing control unit 960 uses a switch signal to inform the digitizing apparatus 300 that the oscillating square wave signal OW outputted by the waveform generator 920 represents equivalent capacitance of another row of capacitors. In addition, when the equivalent capacitance values of difference rows of capacitors of the capacitance touch panel 910 are outputted from the multiplexer 970, the sensing control unit 960 performs corresponding current control on the waveform generator 920. The waveform generator 920 generates an oscillating square wave signal OW with a corresponding period according to the current control of the sensing control unit 960 and the capacitance value outputted by the multiplexer 970. The digitizing apparatus 300 generates a corresponding digital capacitance value according to the reference clock signal SC and the period of the input oscillating square wave signal OW. The timing control circuit 340 of the digitizing apparatus 300 learns whether a currently received oscillating square wave signal OW represents the equivalent of the another row of capacitors according to the switch signal outputted by the sensing control unit 960. In another embodiment, when the timing control circuit 340 learns that the oscillating square wave signal OW represents the equivalent capacitance of the another row of capacitors according to the switch signal (i.e., the multiplexer 970 is switched to the another row of capacitors), the timing control circuit 340 calculates a sampling period (i.e., counts a number of periods of the oscillating square wave signal OW until a predetermined value is reached), and generates a control signal CS3 to the period counter 310 so that the period counter 310 starts counting. The coordinate calculator 940 in sequence receives from the digitizing apparatus 300 a digital capacitance value of each row of capacitors, and compares each of the digital capacitance values with a previous digital capacitance value of the corresponding row of capacitors to obtain a coordinate signal C comprising a coordinate position where a user touches the capacitance touch panel 910. The microcontroller 950 receives the coordinate signal to perform subsequent associated data processing.

In the foregoing embodiment, the sensing control unit 960 and the microcontroller perform different controls; however, in practical applications, a sensing control unit may be integrated with a microcontroller to form a single controller for controlling a capacitance touch panel apparatus.

It is to be noted that, the microcontroller 950 provided by the present invention stays aware that the capacitance touch panel apparatus 900 currently operates in a high coordinate resolution mode or a low coordinate resolution mode at all times. When the capacitance touch panel apparatus 900 currently operates in the high coordinate resolution mode, the microcontroller 950 generates a control signal CS5 to the timing control circuit 340 (not shown) of the digitizing apparatus 300, so as to control the timing control circuit 340 to generate a control signal CS4 for turning on the phase digitizer 330, such that the phase digitizer 330 generates a high-resolution digital capacitance value c3. Otherwise, when the capacitance touch panel apparatus 900 currently operates in the low coordinate resolution mode, the microcontroller 950 generates the control signal CS5 to the timing control circuit 340, so as to control the timing control circuit 340 to generate the control signal CS4 for turning off the phase digitizer 330, such that the digitizing apparatus 300 generates a low-resolution digital capacitance value c3 to reduce power consumption. However, the power saving function is not an essential feature of the present invention, and a circuit designer can include or leave out the function according to application requirements.

In the foregoing embodiments, a capacitance touch panel apparatus provided by the present invention is described for illustration purposes, and a digitizing apparatus and an associated method provided by the present invention may also be applied to other electronic apparatuses for digitizing signals.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A digitizing apparatus, comprising:
    a timing control unit, for generating a first control signal according to a square wave signal and a predetermined value;
    a period counter, for generating a first digital value according to a reference clock signal and the first control signal;
    a phase digitizer, for generating a second digital value according to a phase difference between the square wave signal and the reference clock signal; and
    a calculation unit, for generating an output digital value according to the first digital value and the second digital value.

2. The digitizing apparatus as claimed in claim 1, wherein the phase digitizer generates the second digital value according to the phase difference between a first reference point of the reference clock signal and a second reference point of the square wave signal.

3. The digitizing apparatus as claimed in claim 2, wherein the first reference point is generated earlier than the second reference point.

4. The digitizing apparatus as claimed in claim 3, wherein the calculation unit comprises:
   a shifter, for shifting the first digital value leftward by Q bits to generate a shifted first digital value; and
   an adder, for adding the shifted first digital value to the second digital value to generate the output digital value;
   wherein, the second digital value is a Q-bit value.

5. The digitizing apparatus as claimed in claim 2, wherein the second reference point is generated earlier than the first reference point.

6. The digitizing apparatus as claimed in claim 5, wherein the calculation unit comprises:
   a shifter, for shifting the first digital value leftward by Q bits to generate a shifted first digital value; and
   a subtracter, for subtracting the second digital value from the shifted first digital value;
   wherein, the second digital value is a Q-bit value.

7. The digitizing apparatus as claimed in claim 1, wherein the timing control unit further generates a second control signal according to the predetermined value to turn on or turn off the phase digitizer.

8. The digitizing apparatus as claimed in claim 1, applied to a capacitance touch panel, wherein the square wave signal is associated with equivalent capacitance of one of a plurality capacitors on the capacitance touch panel.

9. The digitizing apparatus as claimed in claim 1, wherein the phase digitizer comprises:
   a phase detecting unit, for detecting the phase difference between the square wave signal and the reference clock signal to generate a phase signal;
   a phase to voltage converter, for generating a voltage signal according to the phase signal; and
   a voltage to digital-value converter, for generating the second digital value according to the voltage signal and a reference voltage signal.

10. A capacitance touch sensing apparatus, comprising:
    a capacitance touch panel;
    a multiplexer, coupled to the capacitance touch panel;
    a waveform generator, for generating a square wave signal according to a capacitance value generated by the capacitance touch panel via the multiplexer; and
    a digitizing apparatus, comprising:
       a timing control unit, for generating a first control signal according to the square wave signal and a predetermined value;
       a period counter, for generating a first digital value according to the first control signal and a reference clock signal;
       a phase digitizer, for generating a second digital value according to a phase difference between the square wave signal and the reference cock signal; and
       a calculation unit, for generating an output digital value according to the first digital value and the second digital value.

11. The capacitance touch sensing apparatus as claimed in claim 10, wherein the timing control circuit further generates a second control signal according to the predetermined value to turn on or turn off the phase digitizer.

12. The capacitance touch sensing apparatus as claimed in claim 10, wherein the phase digitizer comprises:
    a phase detecting unit, for detecting the phase difference between the square wave signal and the reference clock signal to generate a phase signal;
    a phase-difference to voltage converter, for generating a voltage signal according to the phase signal; and
    a voltage to digital-value converter, for generating the second digital value according to the voltage signal and a reference voltage signal.

13. The capacitance touch sensing apparatus as claimed in claim 10, further comprising:
    a sensing control unit, for performing current control on the waveform generator and generating the select signal.

14. A digitizing method, comprising:
    generating a first control signal according to a square wave signal and a predetermined value;
    counting according to a reference clock signal and the first control signal to generate a first digital value;
    digitizing a phase difference between the square wave signal and the reference clock signal to generate a second digital value; and
    calculating according to the first digital value and the second digital value to generate an output digital value.

15. The digitizing method as claimed in claim 14, wherein the step of digitizing the phase difference between the square wave signal and the reference clock signal to generate the second digital value comprises:
    obtaining the second digital value according to the phase difference between a first reference point of the reference clock signal and a second reference point of the square wave signal.

16. The digitizing method as claimed in claim 15, wherein the first reference point is generated earlier than the second reference point.

17. The digitizing method as claimed in claim 16, wherein the step of calculating according to the first digital value and the second digital value to generate the output digital value comprises:
    shifting the first digital value leftward by Q bits to generate a shifted first digital value; and
    adding the shifted first digital value and the second digital value to obtain the output digital value;
    wherein, the second digital value is a Q-bit value.

18. The digitizing method as claimed in claim 15, wherein the second reference point is generated earlier than the first reference point.

19. The digitizing method as claimed in claim 18, wherein the step of calculating according to the first digital value and the second digital value to generate the output digital value comprises:
    shifting the first digital value leftward by Q bits to generate a shifted first digital value; and
    subtracting the second digital value from the shifted first digital value to obtain the output digital value;
    wherein, the second digital value is a Q-bit value.

* * * * *